Jan. 29, 1957  J. MacBLANE ET AL  2,779,038
APPARATUS FOR CUTTING AND INSERTING RESILIENT
PLUGS IN THREADED FASTENING MEMBERS
Original Filed Oct. 14, 1949  4 Sheets-Sheet 1
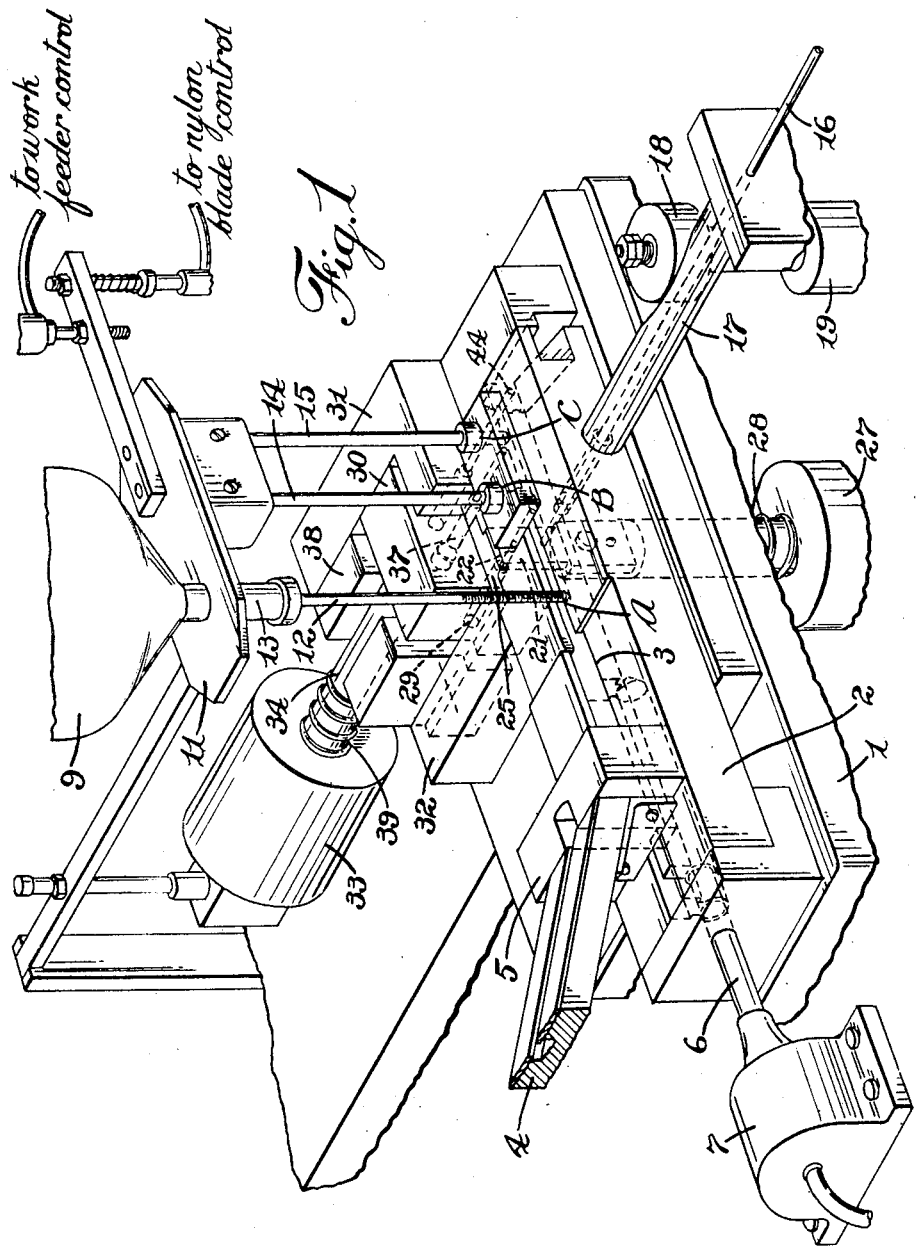
INVENTORS
James MacBlane
Robert N. Paterson
BY
Campbell, Brumbaugh, Free & Graves
their ATTORNEYS

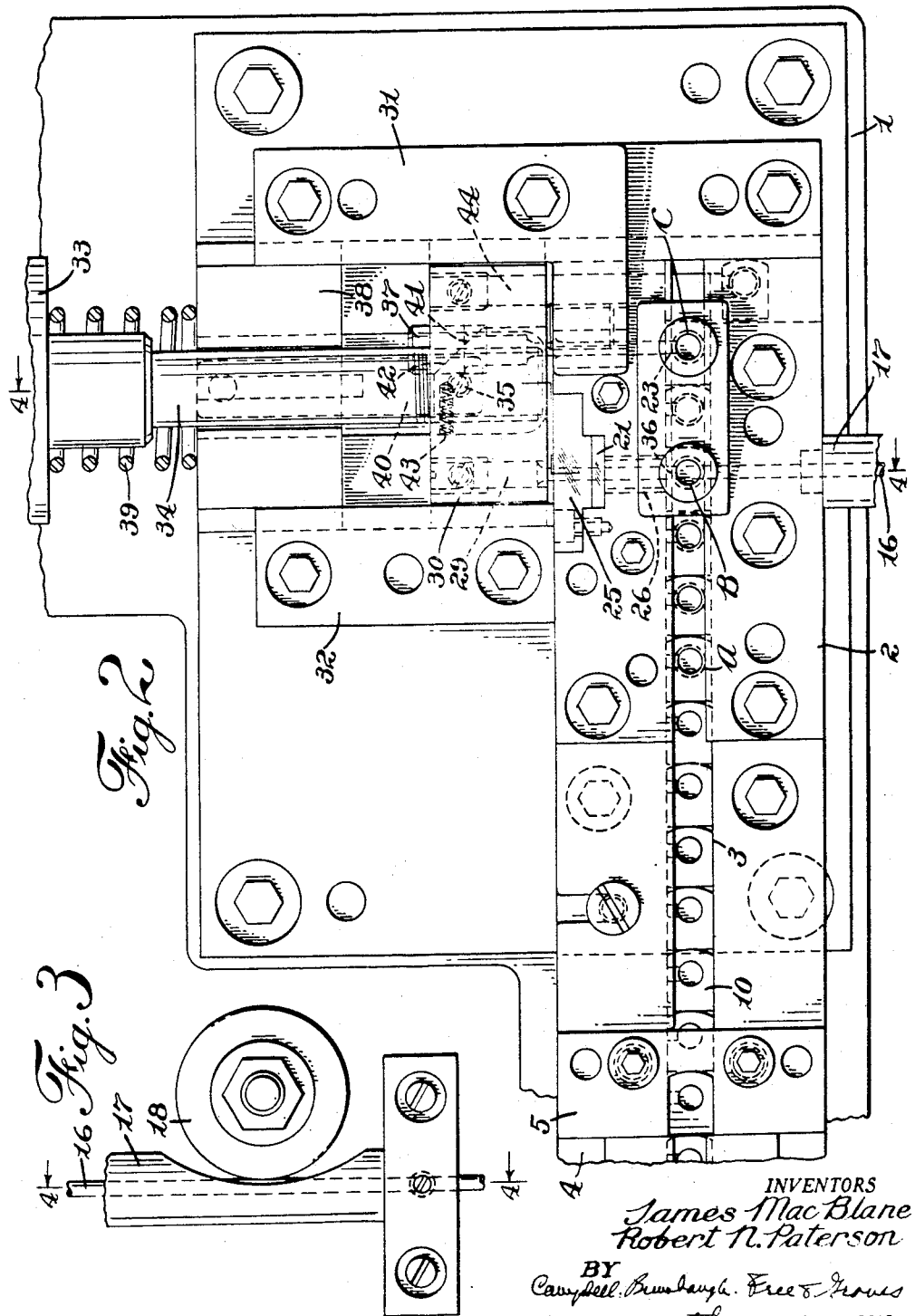

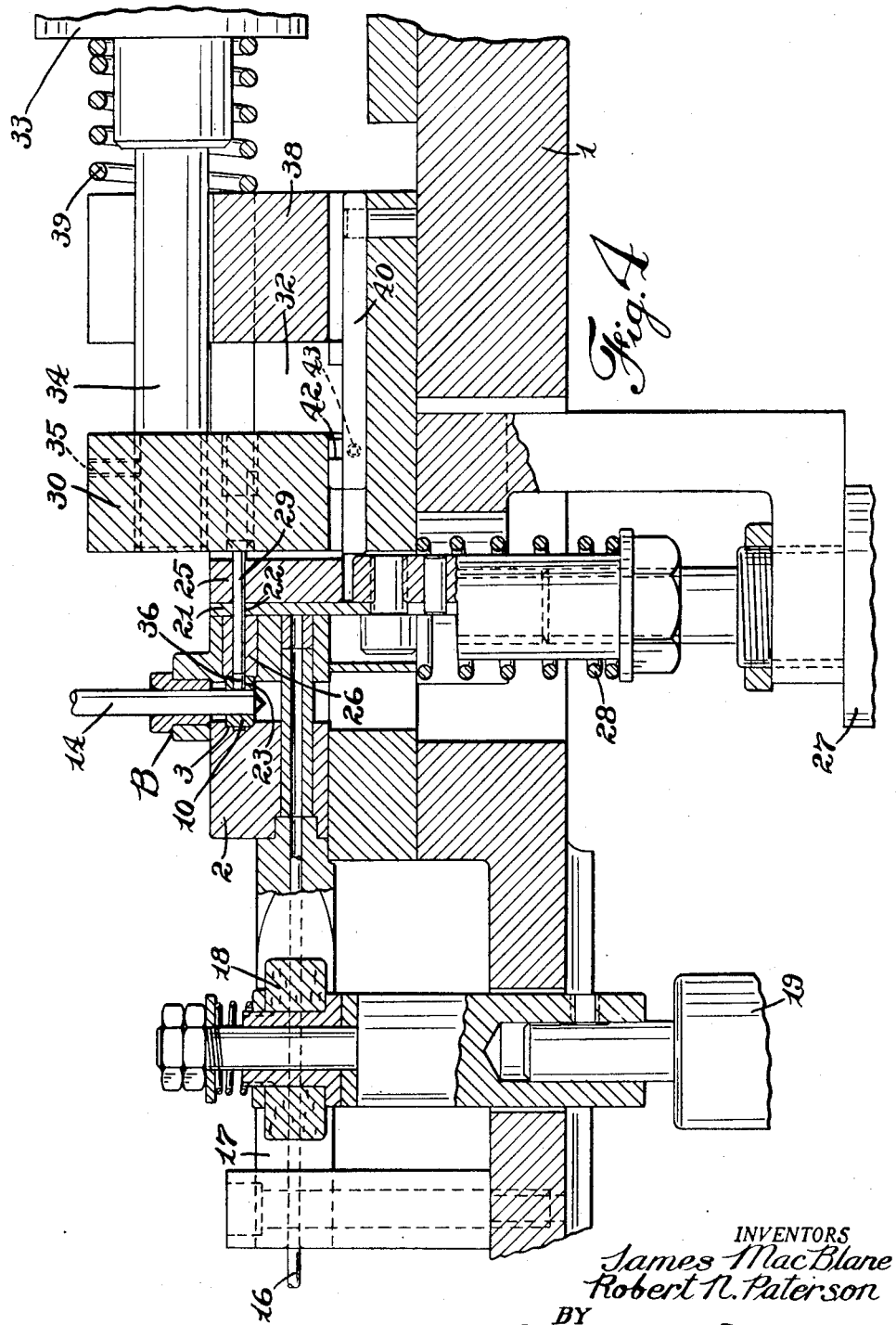

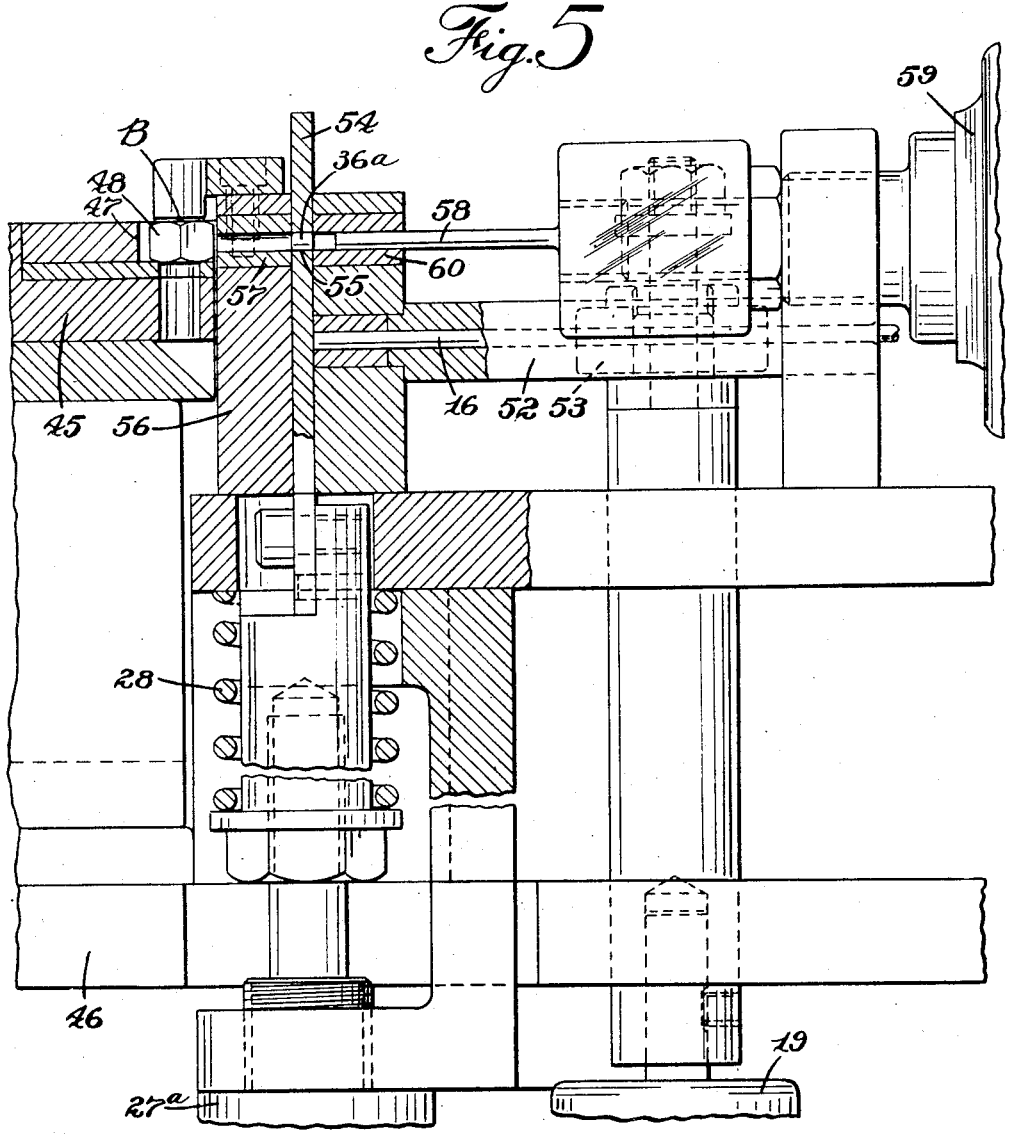

United States Patent Office 2,779,038
Patented Jan. 29, 1957

2,779,038

APPARATUS FOR CUTTING AND INSERTING RESILIENT PLUGS IN THREADED FASTENING MEMBERS

James MacBlane and Robert N. Paterson, Horseheads, N. Y., assignors, by mesne assignments, to The Nylok Corporation, New York, N. Y., a corporation of Delaware Original application October 14, 1949, Serial No. 121,282, now Patent No. 2,643,403, dated June 30, 1953. Divided and this application April 6, 1953, Serial No. 346,966

1 Claim. (Cl. 10—72)

The present invention relates to a machine for cutting off and pressing an insert of frictional material through an opening in the side wall of a nut.

This is a division of our application Serial No. 121,282, filed October 14, 1949, now Patent No. 2,643,403, issued June 30, 1953.

It is an object of the present invention to provide a novel machine of the above character which is rapid and effective in operation, simple in construction and uniform in result.

Further objects and advantages will be apparent from the following description taken in connection with the accompanying drawings in which:

Fig. 1 is a perspective view of a machine for making lock nuts, including the plug cutting and inserting device embodying the present means.

Fig. 2 is an enlarged top plan view of the main operating portion of the machine;

Fig. 3 is a detail of the feeding means for the supply of friction material;

Fig. 4 is a vertical sectional view taken on the lines 4—4 of Figs. 2 and 3 showing more particularly the mechanism for cutting off and inserting the frictional material embodying the invention; and Fig. 5 is an enlarged sectional detail of a mechanism for cutting off and inserting the frictional material in nuts carried in a modified type of lock-nut machine.

In Fig. 1 of the drawing there is illustrated a machine for manufacturing friction grip nuts generally of the type disclosed in the Boots U. S. Patent 2,462,603, dated February 22, 1949. The machine comprises a base 1 on which is rigidly mounted a work holder and guide member 2 having a rectilinear guide channel 3 along which the work-pieces in the form of nuts to be operated on are arranged to be slid. The guide 3 is of such width as to slidably receive the nuts but prevent any substantial rotation of the nut in the guide. As shown in Fig. 2, the nuts 10 are rectangular in form with one end rounded off, and having a hole through one side wall for the reception of the friction material.

A feeding mechanism, not illustrated since it forms no part of the present invention, introduces the work-pieces in an inclined slide 4 which terminates at and is rigidly fixed to a vertical guide block 5 which is arranged above the starting end of the guide slot 3. Means for moving the nuts along the guide slot in a step-by-step manner is provided in the form of a plunger 6 actuated by a suitable power device 7 which is preferably a compressed air ram so controlled as to actuate the plunger 6 in proper timed relation with the other mechanical elements of the machine.

Three operative stations are located along the guide slot 3, at which stations the three operations of tapping out the interior of the nuts, inserting the frictional material and staking the material in the nut are performed in sequence. At the station indicated by the letter A, a tapping machine 9 is located directly above the nut occupying that station, which machine is arranged to advance a carrier plate 11 and tap 12 downwardly while rotating the tap in a forward direction, and thereafter to reverse the rotation of the tap and withdraw the tap and carrier plate upwardly.

The plate 11 carries a tap holder 13 and dowel rods 14 and 15 which are located over the guide slot 3 and define respectively the second operative position B and the third operative position C in said guide.

At station B there is located the means for cutting off a slug of friction material and inserting it in the opening drilled in the side of the nut. As best shown in Fig. 4, a supply of frictional material 16 in the form of a rod preferably of plastic material such as nylon is entered in a tubular guide member 17 which holds it in frictional engagement with a wheel 18 kept constantly in rotation by a motor 19 in a direction to cause the nylon rod to be urged to the right in Fig. 4. The guide 17 is located below the guide 3 for the work-pieces, and a blade 21 having an opening 22 therein is mounted for vertical sliding movement so as to bring its opening 22 alternately into registry with the nylon rod, or with the opening 23 drilled in the side of the nut 10. A back stop 25 provides a guide for the blade 21 and also serves to limit the travel of the nylon rod 16 after it traverses the opening 22 in the blade 21. A bushing 26 having a bore slidably receiving the slug of frictional material is interposed between the blade 21 and the side of the nut 10 to guide the slug into the opening 23 of the nut.

Means for reciprocating the blade 21 is provided, comprising a pneumatic ram 27 for projecting the blade upwardly and a spring 28 for returning the blade to its lower position.

Means is provided for inserting in the hole 23 of the nut the slug of friction material sheared from the end of the rod 16 by the upward movement of the blade 21. For this purpose a punch 29, slightly smaller in diameter than the bore of the hole 22 and bushing 26, is slidably mounted in registry with said bushing and the hole 23 in the nut. Punch 29 is anchored in any suitable manner in a cross-head 30 which is slidably mounted between guides 31 and 32. Cross-head 30 is actuated by a pneumatic ram 33 having a plunger 34 fixed to the cross-head as indicated at 35. The travel of the punch 29 is such that when withdrawn the end of the punch is retracted within the back stop member 25 in which it is guided, and when projected to the end of its stroke the end of the punch is substantially flush with the outer surface of the nut 10, having pressed the slug 36 of friction material into the opening 23 of the nut as shown in Fig. 4. The thickness of the blade 21 is such that the slug 36 sheared off thereby from the friction material 16 is substantially the same length as the thickness of the wall of the nut 10, so that when the slug is inserted in the hole 23 of the nut by the punch 29, it is pressed firmly against the dowel 14 positioning the nut in the guide 3.

The means for staking or clamping the slug 36 of frictional material in the nut at station C is best shown in Fig. 2. As there shown, a staking punch 37 is slidably mounted in the cross-head 30 in registry with the opening 23 of the nut when it occupies the third station. The end of the punch is slightly larger than said opening and the tip may be formed concave or with any other suitable contour to deform the metal of the nut around the opening so as to press it inwardly to firmly clamp the nylon slug in the opening. Means for actuating the punch 37 is provided comprising a hammer block 38 slidably mounted between the guides 31, 32 back of the cross-head 30 and urged toward said cross-head by a compression spring 39. When the cross-head 30 is withdrawn by the pneumatic ram 33, it forces the hammer block 38 back against the spring 39 to the position shown in Fig. 4 where it is held by a pivoted latch member 40. On the subsequent forward movement of the cross-head 30, near the end of its outward stroke, an inclined shoulder 41 thereof cams the nose 42 of the latch member sidewise against the latch spring 43, thus releasing the hammer block 38 and causing it to strike the punch 37 with a blow of substantially uniform force.

The guideway 3 terminates beyond the station C with a lateral opening for discharge of the finished nuts. Means for ejecting the nuts through said opening is provided in the form of a plunger 44 anchored in the cross-head 30 in position to engage and eject the nut at the end of the guide 3.

As indicated in Fig. 1, all the actuating devices 7, 27 and 33 are timed from the automatic tapping head 9 which is timed by any suitable controlling means to cause it to operate at the desired speed. The plate 11 which is reciprocated by the tapping means is used to operate the various levers and plungers which control the pneumatic rams for the various operations.

In the operation of this embodiment, work-piece nuts arriving in the feed guide 4 drop down through the vertical guide 5 into horizontal guide 3 and are advanced step-by-step in said latter guide by the advancing ram 6. When a nut arrives at station A, the automatic tap advances and taps out the interior of the nut, when the nut reaches station B, the blade 21 shears off a slug of friction material 16 and raises it into registry with the hole 23 in the nut, whereupon the punch 29 forces the slug out of the blade 21 into the hole in the nut. The inserting punch 29 is thereupon withdrawn, and when the nut reaches the station C the staking punch 37 is caused to strike the edge of the hole in the nut so as to cause it to clamp the slug of friction material firmly therein. The next step brings the nut into registry with the ejection opening whereupon the punch 44 ejects the finished nut.

A modified type of plug cutting and inserting means is shown in Fig. 5. This cutting and inserting means is similar to the corresponding means shown in Figs. 1 to 4 except that the nylon rod is fed to the shear blade from the side opposite to the nut. It comprises a tubular holder and guide 52 for the nylon rod and a constantly rotating friction wheel 53 which advances the nylon into contact with the vertically reciprocating blade 54. This blade is actuated by a pneumatic ram 27ª and is provided with an opening 55 which is brought into registry with the end of the nylon rod at the bottom of the stroke of the blade, whereupon the nylon rod traverses the blade through said opening until stopped by the back-stop 56. Upon the subsequent upward stroke of the blade, a slug of nylon 36ª is sheaded off from the end of the rod and conveyed into registry with a tubular guide 57 which registers with the hole in the nut occupying the operative position B.

A punch 58 is actuated by a pneumatic ram 59 and is guided by a bearing member 60 so as to cause it to traverse the opening 55 in the blade 54 and force the nylon slug through the guide 57 into the hole in the work-piece nut 48.

It will be understood from the preceding description that the plug cutting and inserting mechanism can be used to cut plugs from rods of nylon or the like of different diameters and that the length of the plugs can be regulated by the use of shear blades of appropriate thickness and having openings of appropriate diameter to receive the ends of the rods.

Accordingly, the forms of the invention described above should be considered as illustrative of the invention and not as limiting the scope of the following claim.

We claim:

A device for forming resilient plugs and inserting them in threaded fastening elements comprising a fixture to receive a series of fastening elements, each element comprising a nut having a hole extending through a side wall thereof into its threaded central opening, dowel means to position a fastening element in the fixture to receive a resilient plug, means adjacent to said fixture to advance a rod of resilient material endwise, fixed guide means to receive the leading end of said rod, a movable plate member in shearing engagement with said guide member and having an opening to receive the leading end of said rod, means to move said movable member to sever a section from the end of said rod and position it in alignment with the hole in said fastening element, a reciprocable punch member movable thruogh said opening to eject said section from the opening and insert it in the hole, means to actuate said rod advancing means, move said movable member and reciprocate said punch in timed relation, and means also actuated in timed relation to move the dowel means into the central opening of the nut to position the nut precisely in the fixture and to present a dowel surface to the inner end of the hole through the wall of the nut against which the sheared off end of the resilient rod is forced, thereby to position it in a precisely predetermined axial position with respect to the nut.

References Cited in the file of this patent

UNITED STATES PATENTS

| | | |
|---|---|---|
| 507,263 | Egge | Oct. 24, 1893 |
| 609,899 | McGee | Aug. 30, 1898 |
| 1,715,099 | Robinson | May 28, 1929 |
| 2,338,330 | Huebner | Jan. 4, 1944 |
| 2,568,438 | Friedman | Sept. 18, 1951 |

FOREIGN PATENTS

| | | |
|---|---|---|
| 230,309 | Switzerland | June 1, 1944 |